(12) United States Patent
Kamata

(10) Patent No.: US 6,614,993 B2
(45) Date of Patent: Sep. 2, 2003

(54) LENS-FITTED PHOTO FILM UNIT AND MANUFACTURING METHOD THEREFOR

(75) Inventor: Kazuo Kamata, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/863,298

(22) Filed: May 24, 2001

(65) Prior Publication Data

US 2001/0046382 A1 Nov. 29, 2001

(30) Foreign Application Priority Data

May 26, 2000 (JP) ........................................ 2000-156919

(51) Int. Cl.[7] ............................ G03B 17/02; B23P 19/00
(52) U.S. Cl. ............................................. 396/6; 29/806
(58) Field of Search ................................. 29/806; 396/6, 396/429

(56) References Cited

U.S. PATENT DOCUMENTS 5,339,127 A * 8/1994 Muramatsu ................... 396/6
5,349,410 A * 9/1994 Kamata ........................ 396/6

FOREIGN PATENT DOCUMENTS

JP 3135092 12/2000

* cited by examiner

Primary Examiner—David Gray
(74) Attorney, Agent, or Firm—Young & Thompson

(57) ABSTRACT

A lens-fitted photo film unit has a body section, a front cover and a rear cover, all of which are plastic parts. These plastic parts are made of raw materials restored from used plastic parts. A plastic parts recycling line is consituted of a pelletizing line and a non-pelletizing line. In the non-pelletizing line, the used plastic parts are crushed for procuring crushed materials. In the pelletizing line, the crushed materials are melted, extruded and molded into the strand-like resin, which is cut into recycled pellets. The crushed materials are used for forming the plastic parts that are not in contact with a photo film. Meanwhile the recycled pellets are used for forming the plastic parts that are in contact with the photo film.

23 Claims, 4 Drawing Sheets

LENS-FITTED PHOTO FILM UNIT AND MANUFACTURING METHOD THEREFOR

BACKGROUND OF THE INVENTION

1. Field of the Invention

The present invention relates to a recycling plastic parts used in a lens-fitted photo film unit, more particularly to the lens-fitted photo film unit using reproduction plastic parts and its manufacturing method. Hereinafter the lens-fitted photo film unit is referred to as a film unit.

2. Explanations of the Prior Arts

Recently, in order to preserve the environment and reduce the industrial waste, industrial products have been widely recycled. In case of the industrial products with many parts, recycling by each parts is more efficient than recycling products altogether. There are two kinds of parts recycling: reuse and restoring into materials.

The recycling of a film unit is described in detail in Japanese Laid-open Patent Application No. 6-161042. In the photofinishing laboratory, a film cartridge is taken out of the used film unit for photo print processing. The vacant film unit is collected by a manufacturer and is disassembled into parts on the recycling line by the manufacturer. Firstly, a label is removed from the vacant film unit, separating the label from a unit body. Next, the unit body is separated into a body section, a front cover and a rear cover. And finally the body section is separated into a taking lens, an exposure unit, a flash unit and so forth, leaving a plastic body base.

The taking lens, the exposure unit and the flash unit are inspected after cleaning process. The normal ones are sent to the manufacturing line in order to use as parts for a new product. Such plastic parts as the front cover, the rear cover, the body base and so forth are used as plastic materials.

Generally, the used plastic parts are crushed. The crushed materials, which are used as plastic material, are supplied to a plastic-forming machine for forming reproduction plastic parts. In case the crushed materials are used, heat on forming does not completely melt the crushed materials, leaving masses as like little grains on the reproduction plastic parts.

When the masses appear on the surface of the reproduction plastic parts, it presses a photo film to occur pressure marks and scratches on the photo film. In the field of a film unit recycling, the fact was well known that it was impossible to use the crushed materials as plastic materials to prevent from the pressure marks and scratches on the photo film.

For this reason, the crushed materials are processed recycled pellets, which are made as follows: Firstly the crushed materials are melted and formed into strand-formed primary materials by a molding and extruding machine. Secondly, the primary materials are cut at a regular length to recycled pellets. By using the recycled pellets as plastic materials, the reproduction plastic parts are formed by the plastic-forming machine. A manufacturing cost is high in this recycling method because the recycled pellets need to be processed. Since the film unit is characterized by its low cost, manufacturing cost in the reproduction plastic parts gives rise to a serious problem.

SUMMARY OF THE INVENTION

The main object of the present invention is to provide a lens-fitted photo film unit and its manufacturing method for reducing the recycling cost.

Another object of the present invention is to provide a lens-fitted photo film unit and its manufacturing method that make good use of reproduction plastic parts that might have small masses of crushed materials on its surface.

The above object and other objects are achieved by using the reproduction plastic parts, which are made of crushed materials of used plastic parts, where they are not in contact with a photo film such as a front cover. The crushed materials are used as a whole or a part of the plastic materials.

According to a preferred embodiment of the present invention, the crushed materials are not used for parts such as a body base and a rear cover that are in contact with the photo film, but the reproduction plastic parts made of recycled pellets are used. The recycled pellets are used all as plastic materials or mixed with new pure pellets.

According to the present invention, the reproduction plastic parts made of the crushed materials are used for the plastic parts which do not produce pressure marks and scratches. Consequently, the manufacturing cost for the film unit can be lowered.

BRIEF DESCRIPTION OF THE DRAWINGS

The above objects and advantages of the present invention will become apparent from the following detailed description of the preferred embodiments when read in connection with the accompanying drawings.

DETAILED DESCRIPTION OF THE PREFERRED EMBODIMENT

Figure 1:
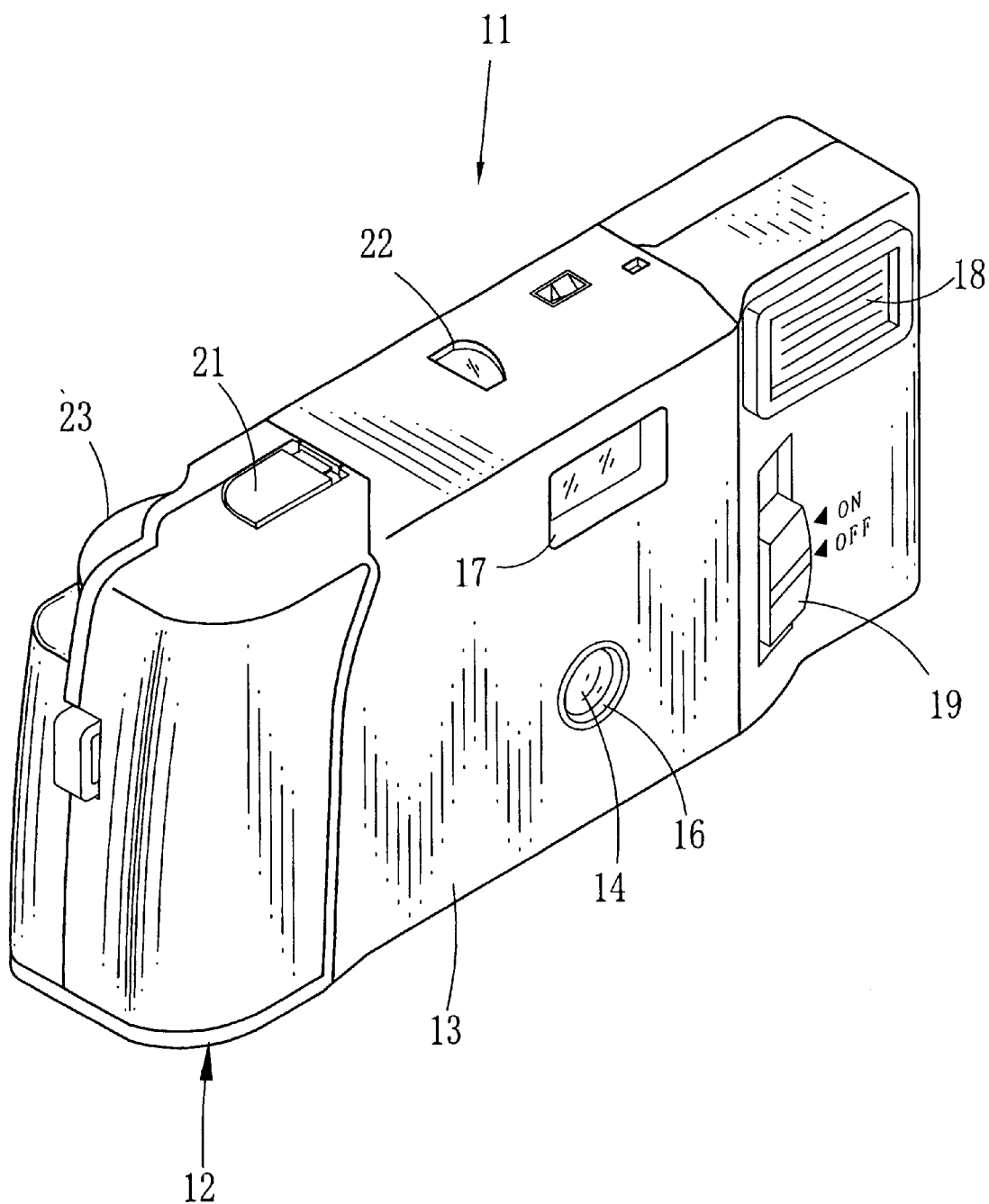
FIG. 1 is a perspective view of a lens-fitted photo film unit of the present invention.

In the FIG. 1, a lens-fitted photo film unit 11 (hereinafter it is referred to a film unit) is consisted of a unit boy 12 preloaded a photo film and a decoration label 13 for partly covering a periphery of the unit body 12. An opening 16 for exposing a taking lens 14, an opening 17 for exposing a finder lens, and an opening for exposing a flash light emitting section 18 are formed in front of the film unit 11. A charging operation member 19 is provided slidable under the flash light emitting section 18. A shutter button 21, a film counter window 22 and so forth are provided on the top surface of the film unit 11, and a winding wheel 23 is exposed through the top surface to the rear surface.

Figure 2:
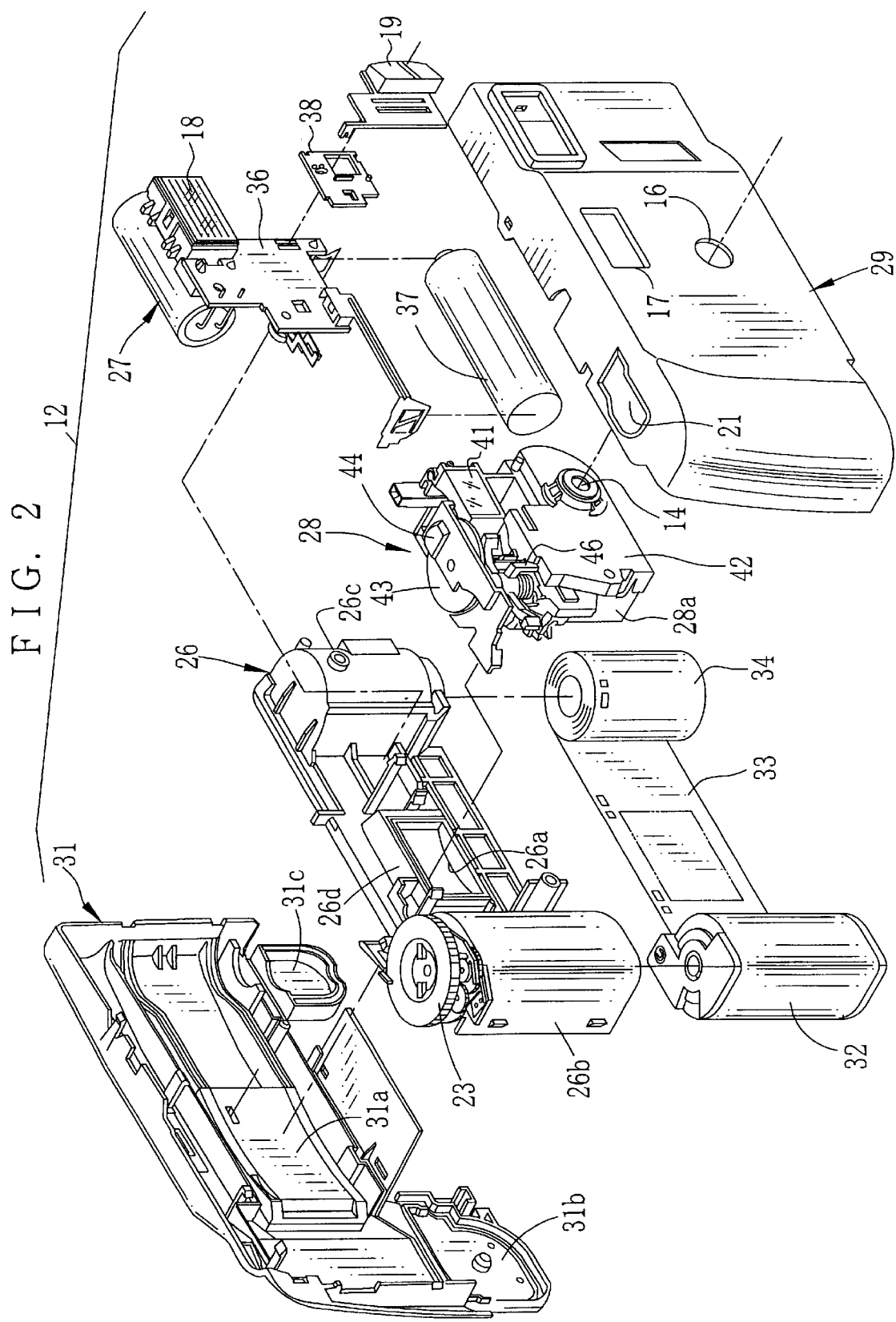
FIG. 2 is an exploded perspective view of a lens-fitted photo film unit.

As shown in FIG. 2, the unit body 12 is constituted from a body section, a front cover 29 and a rear cover 31. The body section has a body base 26, a flash unit 27 and an exposure unit 28. Since the body base 26, the front cover 29 and the rear cover 31 are plastic parts, they are once restored to the raw materials in terms of hygiene and quality.

An exposure frame 26a is formed at the center of the body base 26, whose both sides are provided with a cartridge chamber 26b for loading a cartridge 32 and a film chamber 26c for containing a photo film 33 pulled out of the cartridge 32 in roll form. The exposure frame 26a defines an exposure range in order to create one picture frame. A rear dark box 26d that is protruding like square-formed tube is integrally formed with body base. The exposure unit 28 is provided with a front dark box 28a. By attaching the exposure unit 28 to the body base 26, a dark box is completed by the front dark box 28a and the rear dark box 26d.

Film rails (not shown) are formed on the upper and lower sides of the rear surface of the exposure frame 26a. A film regulation surface 31a is formed at the front of the rear cover 31. By attaching the rear cover 31 to the body base 26, a film winding path is constituted from the film rails and the film regulation surface 31a. The photo film 33 is wound up into the cartridge 32 on every shooting. The photo film 33 is supported with the film rail and the film regulation surface 31a, keeping good flat surface.

Bottom surfaces of the cartridge chamber 26b and the filmroll chamber 26c are openings, which are closed by pull-top style bottom lids 31b and 31c that are freely opened and closed besides a part of the rear cover 31 is made thin. The bottom lid 31b is opened for taking out the cartridge 32 that contains the exposed photo film.

The flash unit 27 is provided with a printed circuit board 36, to which a flash circuit, a flash light emitting section 18, a synchronized switch, a pair of battery contact segments, and a main capacitor are attached. The flash unit 27 is positioned between the exposure unit 28 and the filmroll chamber 26c, and is attached freely to put on and take off to the body base 26 by a snap-in engagement. The electricity is supplied to the flash circuit through a battery power source 37.

The charging operation member 19 for turning on and off the flash circuit is attached to the front surface of the printed circuit board 36 through a supporting plate 38. A metal-made switch segment is attached to the rear surface of the charging operation member 19. When the charging operation member 19 is slid, the switch segment conducts electricity to a contact of the printed circuit board 36, activating the flash circuit. Since the charging operation member 19 is a plastic parts and where a user touches, it is reproduced in terms of hygiene.

The exposure unit 28 is constituted from the front dark box 28a, a finder lens 41, a film counter mechanism, a shutter mechanism and a on-frame winding mechanism. The shutter mechanism has shutter blade (not shown), which is covered, and a shutter cover 42. The taking lens 14 is removably attached to the shutter cover 42 freely.

Several shafts and bearings are formed on the upper part of the front dark box 28a, to which a film counter plate 43, a top plate 44, a shutter driver lever 46, a stop lever, a cam member, a spring and so on are respectively attached. All these parts are made of plastic except for the spring.

Figure 3:
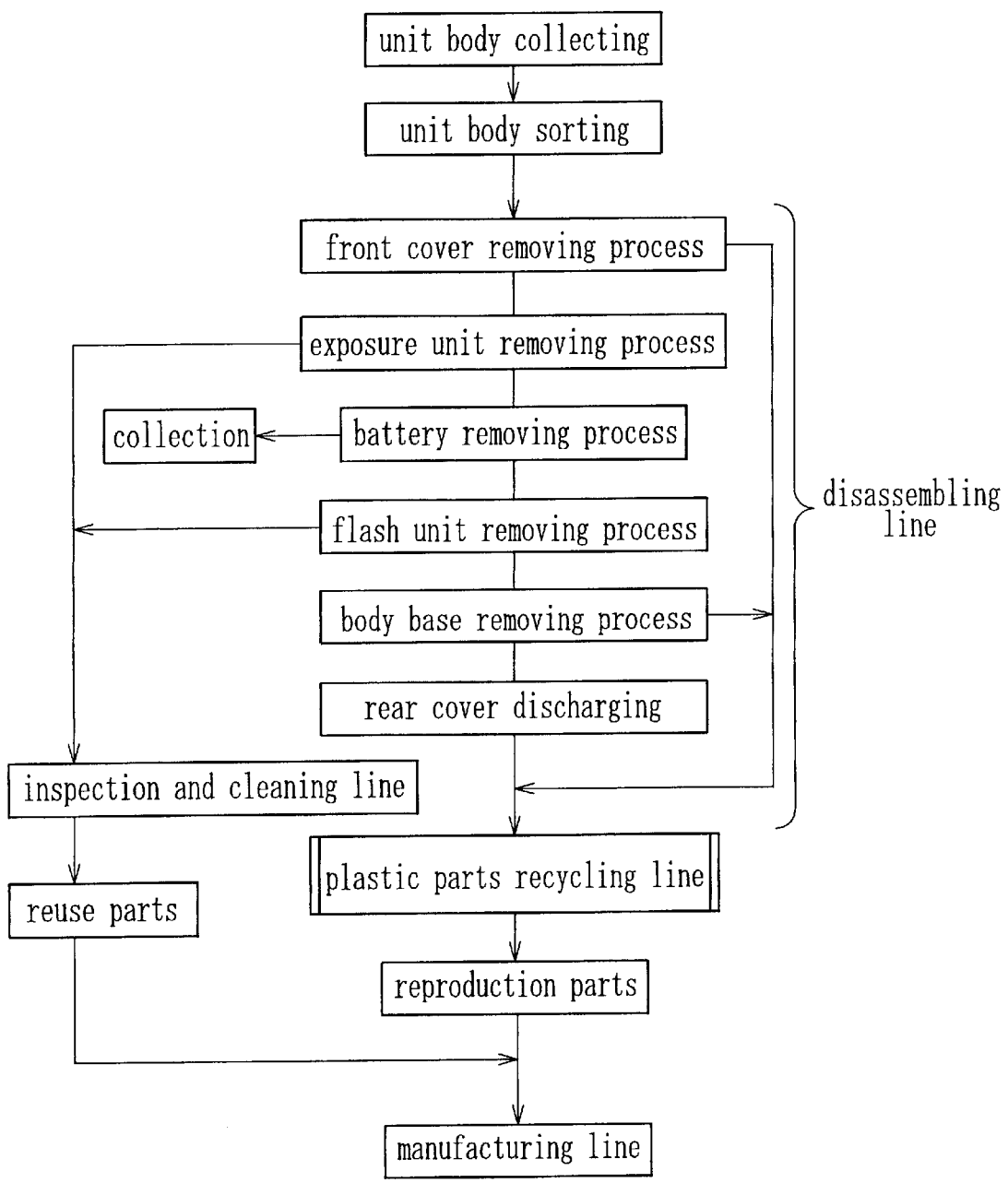
FIG. 3 is a flow chart of a recycling process.
Figure 4:
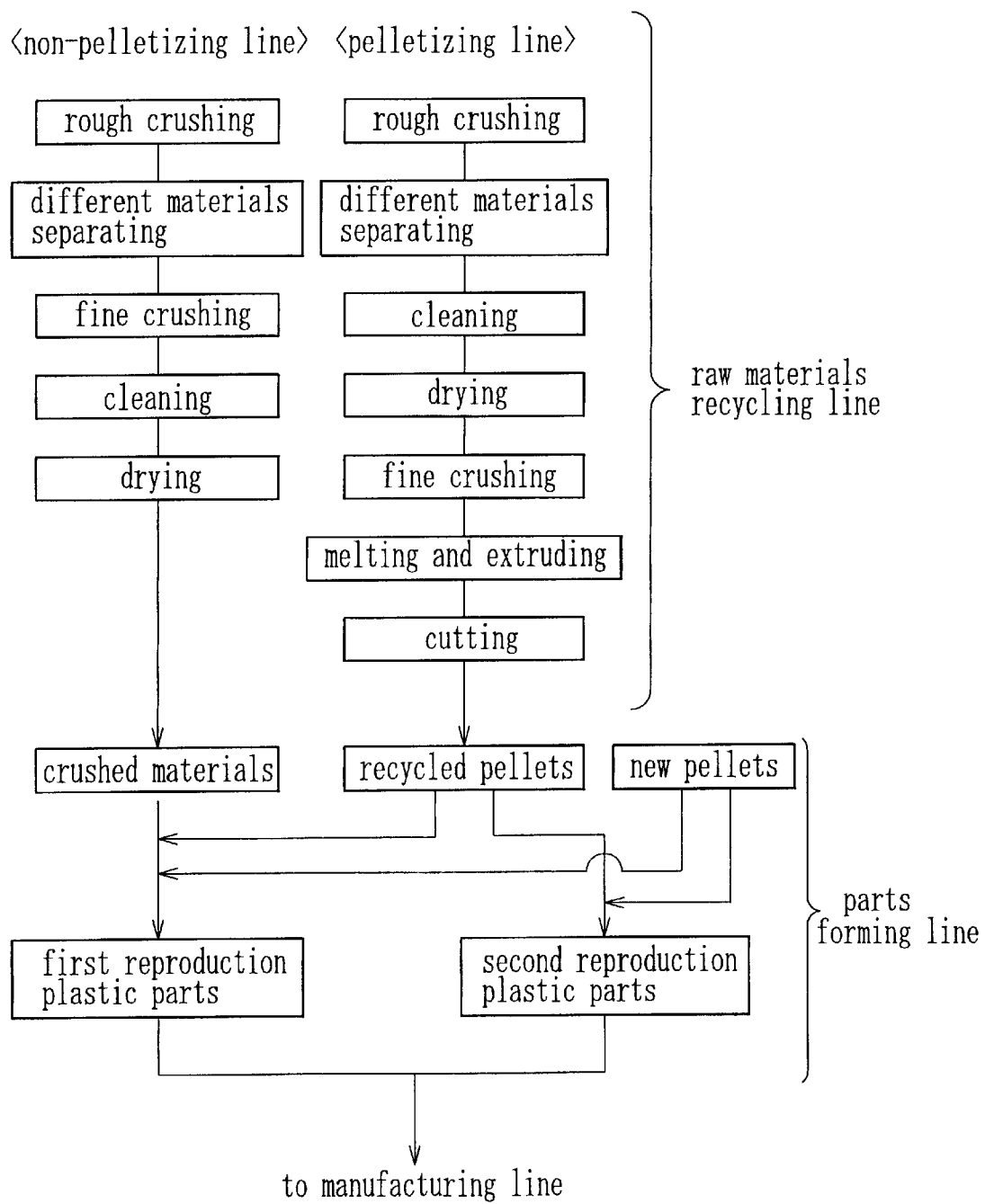
FIG. 4 is a flow chart illustrating a process in which reproduction plastic parts are manufactured.

Referring to FIGS. 3 and 4 illustrating flow charts, the recycling process of the film unit is explained. The recycling line is consisted of a unit body sorting process, a disassembling line, an inspection and cleaning line, a plastic parts recycling line and a manufacturing line. For photo developing, the cartridge 32 contained the exposed photo film 33 are taken out of the used film unit 11 at a photofinishing laboratory, and the unit body 12 is collected by the manufacturer. The collected unit body 12 is sorted out by type at the unit body sorting process and conveyed to the disassembling line that corresponds to the type.

On the disassembling line, the decoration label 13 is peeled off, then the front cover 29, the charging operation member 19 and the winding wheel 23 are removed, whose parts are conveyed to the plastic parts recycling line. Next, the exposure unit 28, the battery power source 37 and the flash unit 27 are removed. The exposure unit 28 and the flash unit 27 are conveyed to the inspection and cleaning line. The battery power source 37 is collected by a battery collecting trader. Finally the rear cover 31 is removed from the body base 26 and each is conveyed to the plastic parts recycling line.

On the inspection and cleaning line, dirt and dust is cleaned off the exposure unit 28 by blowing air and a static electricity is removed by blowing discharging-air after the taking lens 14 is removed. After the cleaning, the functional inspection is performed. Likewise, after the cleaning with water, the functional inspection of the taking lens 14 is performed. The inspection-passed parts are supplied to the manufacturing line as reuse parts. In the same way, after the cleaning by air-blowing, the functional inspection of the flash unit 27 is performed. The passed ones are supplied to the manufacturing line as reuse parts.

As shown in FIG. 4, the plastic parts recycling line are constituted of raw materials recycling line and a parts forming line. And the raw materials recycling line has two lines of a pelletizing line and a non-pelletizing line. In the pelletizing line, the used plastic parts are crushed into crushed materials. After the crushed materials are melted, they are pelletized as recycled pellets. The recycled pellets are supplied to the parts forming line. Meanwhile in the non-pelletizing line, the crushed materials are, without being pelletized, supplied to the parts forming line as raw materials.

The pelletizing line has a rough crushing process, a different materials separating process, a cleaning process, a drying process, a fine crushing process, a molding and extruding process, and a cutting process. The plastic parts are crushed into relatively large grain by a crushing machine in the rough crushing process. After being crushed, the roughly crushed materials are conveyed to the different materials separating process, there different materials from plastic, for instance a metal chip and so on, are separated by a different materials separating machine. The roughly crushed materials are cleaned in the cleaning process, dehydrated and dried in the drying process, and crushed finely in the fine crushing process. In the fine crushing process, the crushed materials are crushed so that it may be more or less equal in size to the recycled pellets or new pure pellets.

The crushed materials are melted, extruded and molded into the strand-like resin by a melt extrusion molding machine. By cooling with water, the strand-like resins are coagulated. After the coagulated strand-like resins are cut at a regular size, the recycled pellets are produced. The recycled pellets are fed into the parts forming line as raw materials.

The non-pelletizing line is comprised a rough crushing process, a different materials separating process, a fine crushing process, a cleaning process, and a drying process. After the plastic parts are roughly crushed in the rough crushing process, different materials are separated in the different materials separating process and they are finely crushed in the fine crushing process. The crushed materials are cleaned, then dehydrated and dried in the drying process. The crushed materials are supplied to the plastic parts forming line as raw materials.

The reproduction plastic parts are made by the metal mold tool, using the crushed materials, the recycled pellets and the new pure pellets as raw materials. These raw materials are mixed for use depending on parts. Also, the reproduction plastic parts have first reproduction plastic parts and second reproduction plastic parts.

The first reproduction plastic parts include the crushed materials, therefore they are not only made of the crushed materials but other plastic-mixed materials with the crushed materials. As for the other plastic-mixed materials, there are recycled pellets or new pure pellets. The mixed proportion of the crushed materials is preferred less than 50 weight percent of all. It is also suitable that the new pure pellets are mixed together with the recycled pellets. Using more than 30 weight percent of the recycled pellets is preferred so as to improve the recycling efficiency.

The second reproduction plastic parts include the recycled pellets, but do not the crushed materials at all. They are made of the recycled pellets only or the mixed materials of the recycled pellets and the new pure pellets. The mixed proportion of the recycled pellets is preferred more than 70 weight percent so as to improve the recycling efficiency. However taking quality into account, roughly 50 percent weight is enough.

The second reproduction plastic parts are used for the parts which contact with the photo film 33 such as the body base 26 and the rear cover 31. Since the second reproduction plastic parts do not include the crushed materials, the unmelted crushed materials on forming do not appear as masses of little grains on the surface. For this reason, it is not likely that the masses of little grains come out as convex portions, which put on pressure strong enough to deform the photo film, generating pressure marks. Likewise, there is no possibility that the convex portions give scratch to the photo film 33.

The first reproduction plastic parts are used for the parts which do not contact with the photo film 33 such as the front cover 29, the charging operation member 19, and the winding wheel 23. Since the first reproduction plastic parts are produced in the non-pelletizing line that omits the pelletizing process, the recycling cost is reduced. Accordingly, the manufacturing cost in the film unit is lowered.

In the manufacturing line, the first and the second reproduction plastic parts, the reuse parts such as the taking lens, and the new parts are assembled into the film unit.

The shutter and so forth are attached to the body base, which can be used the reuse parts so as to omit the assembling process of the shutter and other things. Both the first and the second reproduction plastic parts are used in the film unit. However it is suitable to use only the first reproduction plastic parts, and as for the parts where they are in contact with the photo film, the new parts that do not include the reproduction materials may be used.

Although the exposure unit is the reuse parts in the above embodiment, plastic parts of it can be formed by the recycled plastic materials. As the exposure unit is not in contact with the photo film, the first reproduction plastic parts are used.

Although the present invention has been fully described by way of the preferred embodiments thereof with reference to the accompanying drawings, various changes and modifications will be apparent to those having skills in this field. Therefore, unless otherwise these changes and modifications depart from the scope of the present invention, they should be constructed as included therein.

What is claimed is:

1. A lens-fitted photo film unit having a unit bad into which an unexposed photo film is pre-loaded, said unit body including at least one first plastic part that is arranged s as not to be in contact with said photo film, at least one second plastic part that is arranged so as to be in contact with said photo film, and a simple taking mechanism, said lens-fitted photo film unit comprising:
    a first reproduction plastic part comprising first plastic materials said first plastic materials including crushed, non-pelletized materials recovered from used plastic parts, said first reproduction plastic part being used for said at least one first plastic part; and
    a second reproduction plastic part made of second plastic materials, said second plastic materials comprising recycled pellets, aid recycled pellets being made by a process of said crushed materials being melted, congealed and cut at a regular size, said second reproduction plastic part being used as said second plastic part.

2. A lens-fitted photo film unit as claimed in claim 1 wherein said unit body includes a body base for attaching said taking mechanism and a front cover and a rear cover for attaching said body base, said front cover being said first plastic part and said unit base and said rear cover being said second plastic part.

3. A lens-fitted photo film unit as claimed in claim 1, wherein a proportion of said crushed materials in said first plastic materials is less than 50 percent.

4. A lens-fitted photo film unit as claimed in claim 1, wherein a proportion of said recycled pellets in said first plastic materials is more than 30 percent.

5. A lens-fitted photo film unit as claimed in claim 1, wherein a proportion of said recycled pellets in said second plastic materials is more than 70 percent.

6. A lens-fitted photo film unit as claimed in claim 1, wherein said crushed materials are equal in size with said recycled pellets or new pellets.

7. A manufacturing method of a lens-fitted photo film nit into which an unexposed photo film is pre-loaded, said lens fitted photo film unit having a unit body including at least one first plastic part that is arranged to be not in contact wit said photo film, at least one second plastic part that is arranged to be in contact with said photo film, and a simple taking mechanism, said method comprising steps of:
    making rushed materials by crushing said first and said second plastic parts of a used lens-fitted photo film unit;
    making recycled pellets from a portion of said crushed materials, said recycled pellets being made by a process of said crushed materials being melted, congealed and cut at a regular size;
    forming a first reproduction plastic part from first plastic material comprising said crushed, non-pelletized materials;
    forming second reproduction plastic part from second plastic materials hat includes said recycled pellets; and
    assembling a new lens-fitted photo film unit by use of said first reproduction plastic part as said first plastic part and said second reproduction plastic part as said second plastic part.

8. A method as claimed in claim 7, wherein said first plastic part includes a front cover of said unit body, and said second plastic part includes a rear cover and unit base of said unit body.

9. A method as claimed in claim 7, wherein a proportion of sad crushed materials in said first plastic materials is less than 50 percent.

10. A method as claimed in claim 7, wherein a proportion of sad recycled pellets in said first plastic materials is more than 30 percent.

11. A method as claimed in claim 7, wherein a proportion of sad recycled pellets in said second plastic materials is more than 70 percent.

12. A method as claimed in claim 7, wherein said crushed materials are equal in size with said recycled pellets or new pellets.

13. A method as claimed in claim 7, wherein said first plastic materials include non-recycled pellets.

14. A method of recycling used lens-fitted photo film units and manufacturing new lens-fitted photo film units into which an unexposed photo film is pre-loaded, said lens-fitted photo film unit having a unit body including a body base, a front cover and a rear cover, the body base and rear cover being arranged to be in contact with the photo film, the front cover being arranged so as not to be in contact with the photo film, said method comprising steps of:

removing said body base, said front cover, and said rear cover from said unit body;

making rushed materials by crushing said body base, said front cover, and said rear cover;

subjecting a portion of said crushed materials to melting, congealing, and cutting at a regular size to produce recycled pellets;

forming new front cover from first plastic materials including said crushed, non-pelletized materials;

forming a new body base and a new rear cover from second plastic materials that includes said recycled pellets; and assembling a new lens-fitted photo film unit by use of said new front cover, said new body base and said new rear cover.

15. A method as claimed 14, claim wherein said first plastic materials include nonrecycled pellets.

16. A method as claimed in claim 14, wherein said second plastic materials include non-recycled pellets.

17. A method of recycling used lens-fitted photo film units and manufacturing new lens-fitted photo film units into which an unexposed photo film is pre-loaded, said lens-fitted photo film unit having a unit body including a body base, a front cover and a rear cover, the body base and rear cover being arranged to be in contact with the photo film, the front cover being arranged so as not to be in contact with the photo film, said method comprising steps of:

removing said body base, said front cover, and said rear cover from sad unit body;

making crushed materials by crushing said body base, said front cover, and said rear cover;

subjecting a portion of said crushed materials to melting, congealing, and cutting at a regular size to produce recycled pellets;

forming new front cover from first plastic materials including said crushed materials; and forming a new body base and a new rear cover from second plastic materials that includes said recycled pellets; and assembling a new lens-fitted photo film unit by use of said new front cover, said new body base and said new rear cover;

wherein said first plastic materials include said recycled pellets.

18. The method of claim 14, wherein each of said front covers of the used lens-fitted photo film units is crushed, regardless of a condition of said front cover.

19. A lens-fitted photo film unit having a unit body into which an unexposed photo film is pre-loaded, said unit body including at least one first plastic part that is arranged so as not to be in contact with said photo film, at least one second plastic part that is arranged so as to be in contact with said photo film, and a simple taking mechanism, said lens-fitted photo film unit comprising:

a first reproduction plastic part comprising a combination of first plastic materials and second plastic materials, said first plastic materials including crushed materials, said second plastic materials including recycled pellets, said recycled pellets being made by the process of said crushed materials being melted, congealed and cut at a regular size, said first reproduction plastic part being used for said first plastic part.

20. A lens-fitted photo film unit as claimed in claim 19, further comprising:

a second reproduction plastic part made of said second plastic materials, said second reproduction plastic part being used as said second plastic part.

21. A lens-fitted photo film unit as claimed in claim 20, wherein said unit body includes a body base for attaching said taking mechanism and a front cover and a rear cover for attaching said body base, said front cover being said first plastic part, and said unit base and said rear cover being said second plastic part.

22. A manufacturing method of a lens-fitted photo film unit into which an unexposed photo film is pre-loaded, said lens fitted photo film unit having a unit body including at least one first plastic part that is arranged to be not in contact with said photo film, at least one second plastic part that is arranged to be in contact with said photo film, and a simple taking mechanism, said method comprising steps of:

making crushed materials by crushing said first and said second plastic parts of a used lens-fitted photo film unit;

making recycled pellets from said crushed materials, by melting said crushed materials, congealing, and cutting at a regular size;

forming a first reproduction plastic part from first plastic materials comprising said crushed materials and second plastic materials including said recycled pellets; and assembling a new lens-fitted photo film unit by use of said first reproduction plastic part as said first plastic part.

23. A manufacturing method of a lens-fitted photo film unit as claimed in claim 22, further comprising:

forming a second reproduction plastic part from second plastic materials; and assembling said new lens-fitted photo film unit by use of said second reproduction plastic part as said second plastic part.

* * * * *